United States Patent [19]

Kown

[11] Patent Number: 5,214,923
[45] Date of Patent: Jun. 1, 1993

[54] VUILLEUMIER HEAT PUMP

[75] Inventor: Yong R. Kown, Seoul, Rep. of Korea

[73] Assignee: Samsung Electronics Co., Ltd., Suweon, Rep. of Korea

[21] Appl. No.: 858,720

[22] Filed: Mar. 27, 1992

[30] Foreign Application Priority Data

Mar. 28, 1991 [KR] Rep. of Korea ............... 91-4155[U]

[51] Int. Cl.$^5$ .............................................. F25B 9/00
[52] U.S. Cl. .............................................. 62/6; 60/520
[58] Field of Search ................................ 62/6; 60/520

[56] References Cited

U.S. PATENT DOCUMENTS 3,933,000  1/1976  Doody ........................................ 62/6
4,429,539  2/1984  Leach ........................................ 62/6
4,514,979  5/1985  Mohr ......................................... 62/6

Primary Examiner—Ronald C. Capossela
Attorney, Agent, or Firm—Burns, Doane, Swecker & Mathis

[57] ABSTRACT

A Vuilleumier heat pump comprises an inner cylinder, and an outer cylinder surrounding the inner cylinder. An annular space is created between the wall of the inner cylinder and that of the outer cylinder. At the top of the space, a heat regenerator is positioned. Under the heat regenerator, an intermediate level heat exchanger is positioned. At the bottom of the space, a cold regenerator is positioned. Between the intermediate level heat exchanger and the cold regenerator, a cold heat exchanger is positioned.

12 Claims, 3 Drawing Sheets

FIG. 2
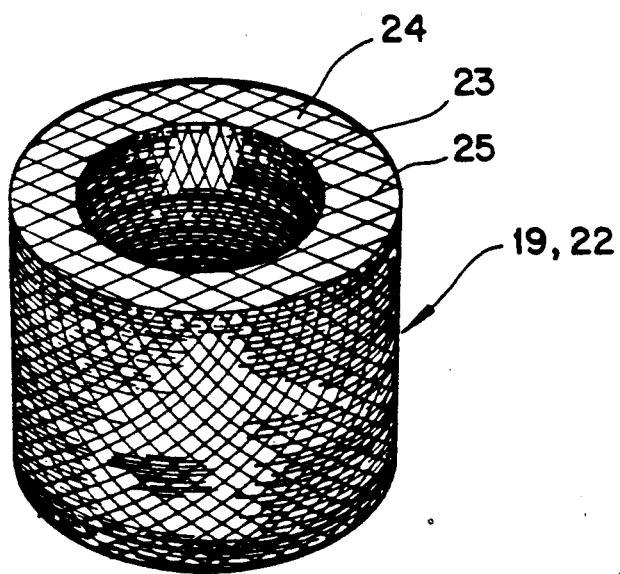
FIG. 3
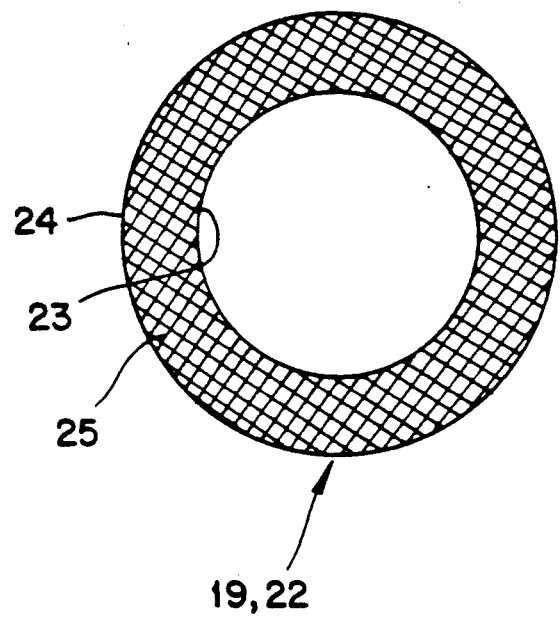
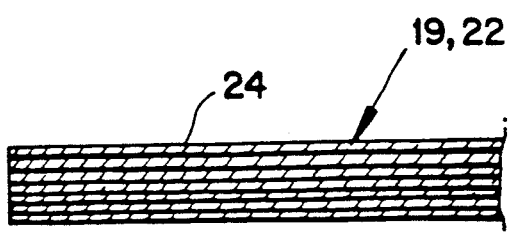
FIG. 4

VUILLEUMIER HEAT PUMP

BACKGROUND OF INVENTION

The invention relates to a Vuilleumier heat pump, and more particularly to a Vuilleumier heat pump with an integral heat exchanger and heat regenerator in a space surrounding an inner cylinder.

Generally, the Vuilleumier heat pump employs the cycling of various volume devices, such as a cylinder having three different temperature chambers. The cylinders are filled with either high pressure helium or hydrogen gas. The inner cylinder is provided with a hot displacer piston and a cold displacer piston reciprocating forward and backward with a phase angle therebetween. Thus, the Vuilleumier heat pump can be used for heating or cooling. In operation a separate burner supplies heat such that the movement of the gas in each of the temperature chambers at predetermined intervals induces gas pressure differences according to the gas temperature changes, thereby performing thermal emission or absorption from the gas.

It is known that the Vuilleumier heat pump is provided with a hot cylinder, a cold cylinder, a heat exchange chamber containing a heat exchanger, and a heat regenerating chamber containing a heat regenerator with the pump being constructed so that the heat exchange chamber and the heat regenerating chamber are separate from the cylinders. Further, the cylinders and the chambers are interconnected with each other by tubes.

Such heat pumps have a low efficiency problem causing not only a working volume but also a dead volume between the cylinders, the heat exchangers and the heat regenerators. Since the heat exchange chamber and the heat regenerate chamber, which are mounted radially against the cylinder, are separate from the cylinders, a complex structure of the heat pump results. These heat pumps have another problem in that they are expensive to produce since they require many steps to manufacture.

SUMMARY OF INVENTION

Accordingly, the present invention is provided to solve the above problem.

It is an object of the invention to provide a Vuilleumier heat pump with a simple structure which can be easily produced and assembled.

It is another object of the invention to provide a Vuilleumier heat pump for reducing unnecessary space resulting from separated members thereof, thereby increasing the efficiency of the heat pump.

According to the present invention, the Vuilleumier heat pump employs an outer cylinder, an inner cylinder mounted coaxially in the outer cylinder so as to create a space between the inner cylinder and the outer cylinder. The inner cylinder has two displacer pistons positioned therein in a manner to create three chambers defining a hot chamber, an intermediate working chamber, and a cold chamber. A hot heat exchange chamber mounts integrally to the top of the outer cylinder, for heat-exchanging with the hot chamber in the inner cylinder. A heat regenerator is positioned proximate the hot chamber, and under the hot heat exchange chamber. An intermediate level heat exchanger mounts in the gas passage, for interchanging heat with the intermediate chamber in the inner cylinder and a cold regenerator. The cold regenerator mounts in the space proximate the lower displacer piston, and under the intermediate level heat exchanger. A cold heat exchanger mounts in the passage under the cold regenerator, for interchanging heat with the cold chamber and the cold regenerator.

BRIEF DESCRIPTION OF DRAWINGS

The invention will be explained in detail thereafter with reference to the accompanying drawings, in which;

FIG. 2 is a perspective view illustrating a heat or cold regenerator according to the present invention;

FIG. 3 is a plan view of the regenerator depicted in FIG. 2;

FIG. 4 is a partial cross-sectional view of the regenerator depicted in FIG. 2;

DETAILED DESCRIPTION OF INVENTION

Figure 1:
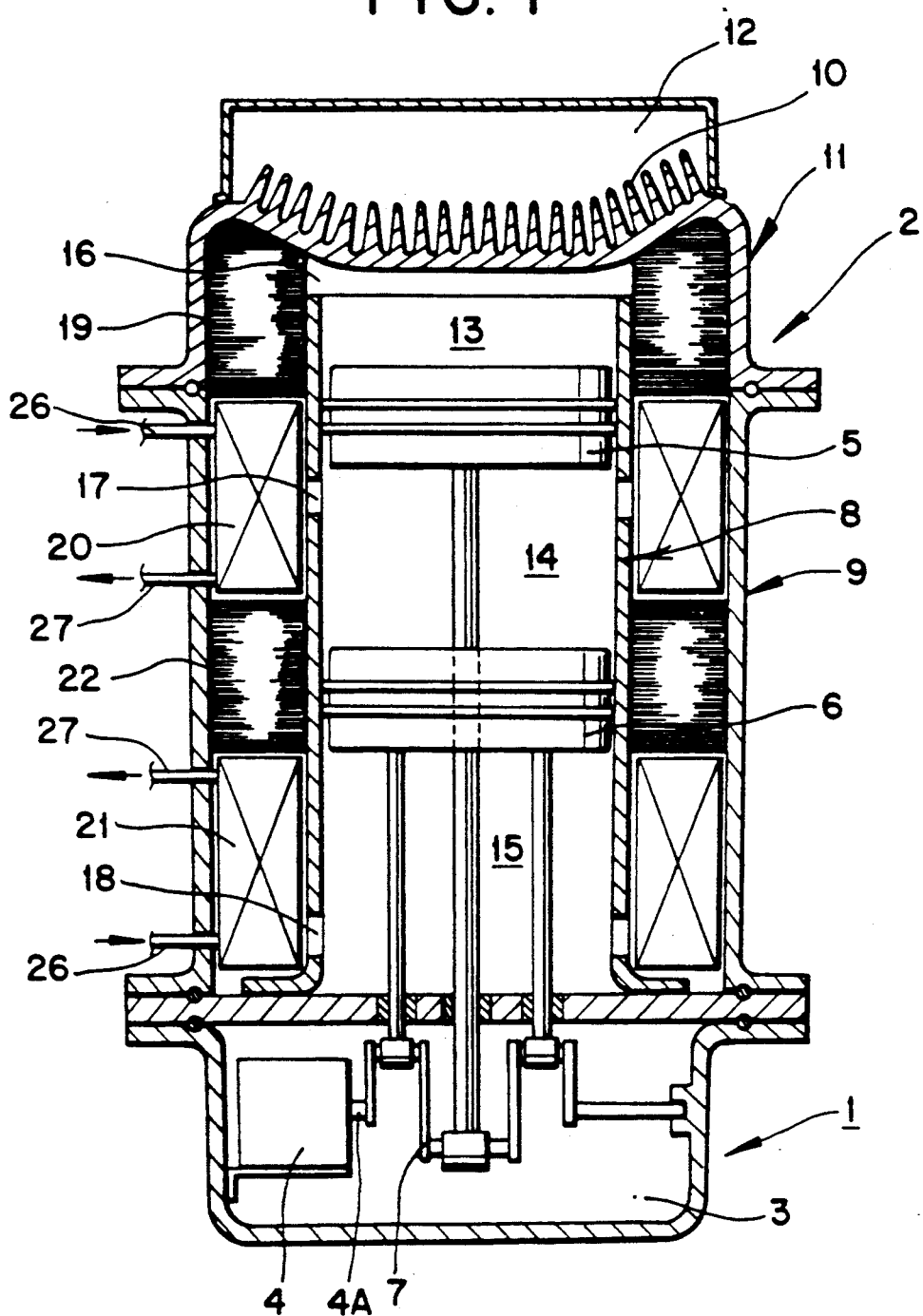
FIG. 1 is a axial sectional view through a Vuilleumier heat pump of the present invention.

FIG. 1 illustrates the Vuilleumier heat pump according to the present invention.

The Vuilleumier heat pump is provided with an driving section 1 for generating rotational movement, a working section 2 operated by the driving section 1 and filled with high pressure helium gas. The driving section 1 is provided with a driving chamber 3 air-tightly assembled with a bottom portion of the working section 2 which will be described later, a driving motor 4 mounted in the driving chamber 3 for generating the power, and a crankshaft 7 connecting to a shaft 4A of the driving motor 4 for operating a pair of displacer pistons 5,6 in the working section 2 in a reciprocating manner.

The working section 2 is provided with an inner cylinder 8 including the displacer pistons 5,6 therein for reciprocating forward and backward with a phase angle, an outer cylinder 9 superposing an external surface of the inner cylinder 8 concentrically, a covering member 11 coupled sealingly with a top of the outer cylinder 9, and the covering member 11 having a plurality of fins 10 located integrally on the top surface of the covering member 11, a hot heat-exchange chamber 12 mounted on the covering member 11 enclosing the fins 10 and heated by a burner (not shown).

Further, the inner cylinder 8 includes a heat displacer piston 5 and a cold displacer piston 6 positioned therein to divide the inner cylinder 8 into a heat chamber 13, an intermediate temperature chamber 14 and a cold chamber 15. Each rod of the displacer pistons includes a connecting rod connecting it to a crankshaft 7.

A space is formed between the inner cylinder 8 and the outer cylinder 9 which is spaced apart from the wall of the inner cylinder 8. The space contains a heat regenerator 19 proximate the heat chamber 13 of the inner cylinder 8. The heat regenerator 19 either reserves energy from the hot gas flowing thereinto, or supplies energy to the cold gas flowing thereinto. The heat regenerator 19 is in contact with and positioned under the covering member 11. A top of the inner cylinder 8 a gas passage 16 is provided. Under the heat regenerator 19, an intermediate temperature level heat exchanger 20 is positioned proximate the intermediate temperature chamber 14 of the inner cylinder 8, for transforming cold water input into hot water output. Communicating with the intermediate temperature chamber 14 is a gas passage 17 extending through the inner cylinder 8. A cold heat exchanger 21 is positioned proximate the cold chamber 15, for transforming hot water input into cold water output. Communicating with the cold chamber 15 is a gas passage 18 extending through the inner cylinder 8. Between the intermediate level heat exchanger 20 and the cold heat exchanger 21, a cold regenerator 22 is placed.

As shown in FIGS. 2,3 and 4, the heat regenerator 19 and the cold regenerator 22 respectively comprise a plurality of ring-shaped heat regenerate plates 24 which are stacked on one another and covered with a mesh metal 25. The heat regenerate plate has a hole 23 in the center thereof, for receiving the inner cylinder 8.

Figure 5:
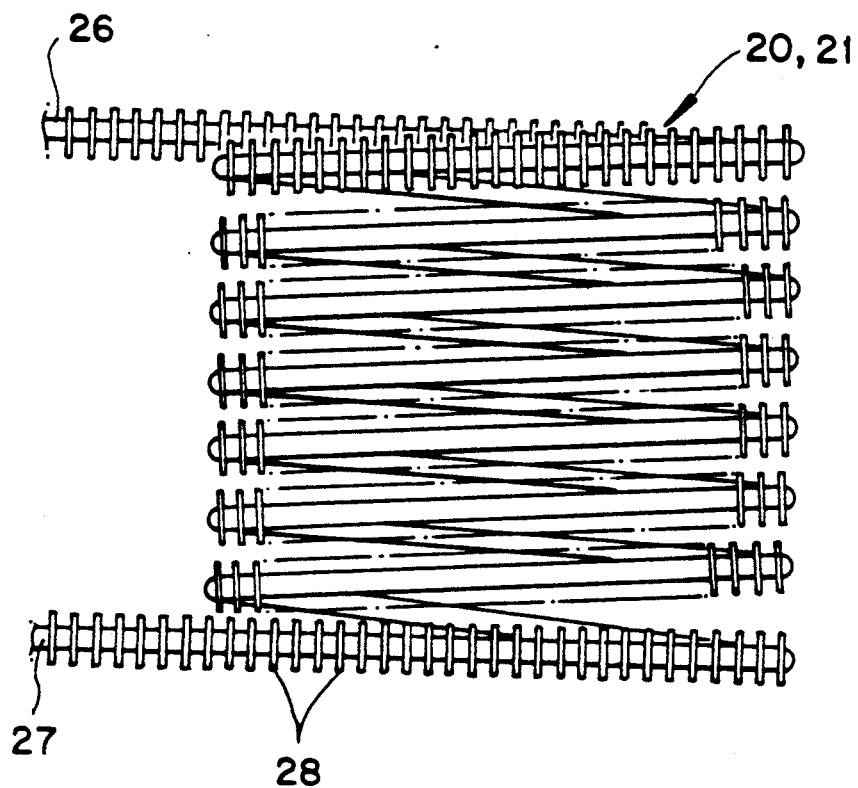
FIG. 5 is a front view of a heat exchanger of the present invention.
Figure 6:
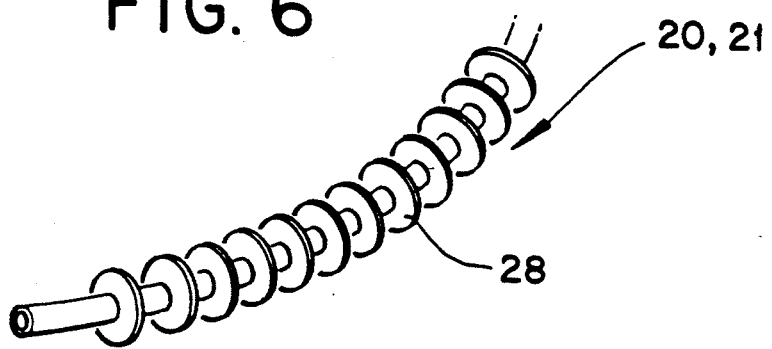
FIG. 6 is a partial perspective view of the heat exchanger depicted in FIG. 5.

As shown in FIGS. 5 and 6, the intermediate level heat exchanger 20 and the cold heat exchanger 21, respectively, compose a tube wound into a helix, surrounding the outer surface of the inner cylinder 8. The tube has an inflowing portion 26 and an outflowing portion 27 at opposite ends. Further, the surface of the tube has a plurality of fins 28 positioned along the axis.

According to such a construction of the heat pump of the present invention, the heat pump is operated by the motor 4 of the driving section 1 as the hot heat-exchange chamber 12 is heated by a burner (not shown). The motor 4 rotates the crankshaft 7 operatively connected thereto. The crank shaft 7 reciprocates the heat displacer piston 5 and the cold displacer piston 6 at the same time in a predetermined phase angle in the cylinder 8. Therefore, gas filled in the heat chamber 13 flows through the gas passage 16,17 into the intermediate temperature chamber 14, or vice versa. Gas filled in the intermediate temperature chamber 14 flows through the gas passage 17,18 into the cold chamber 15, or vice versa. That leads to a change of volume in each chamber 13,14,15, which means that a volumetric change of gas flowing between each of the chambers 13,14,15 is taking place. The pressure difference in the chambers occurs due to the fact that if a high temperature gas increases volumetrically, the pressure of the gas increases, or if a low temperature gas increases volumetrically, the pressure of the gas decreases. The heat gas in the heat chamber 13 is formed by the combustion heat of the burner. The intermediate temperature gas in the intermediate temperature chamber 14 is attained by the hot gas in the heat chamber 13 flowing through the heat regenerator 19 and into the intermediate chamber 14. That is, the heat gas is converted into the intermediate temperature gas as the heat regenerator 19 absorbs the heat of the heat gas which flows through the heat regenerator 19. In the same way, the intermediate temperature gas is converted into cold gas as the cold regenerator 22 absorbs the heat of the intermediate gas which flows through the cold regenerator 22. Since the heat regenerator 19 is in the heat absorbed state, as the intermediate temperate gas flows through the heat regenerator 19 and into the heat chamber 13, the intermediate temperature gas receives the heat from the heat regenerator 19, increasing the temperature of the gas. Also, since the cold regenerator 22 is in the heat absorbed state, as the cold gas flows through the cold regenerator 22 and into the intermediate temperature chamber 14, the cold gas receives heat from the cold regenerator 22, increasing the temperature of the gas.

According to the above process, the heat chamber 13 is maintained at 600° C. to 700° C., the intermediate temperature chamber 14 at 60° C. to 80° C. and the cold chamber at −10° C. to 5° C. Therefore, cold water fed into the inflowing portion 26 of the intermediate level heat exchanger 20 is heat-exchanged with the heat gas passing the intermediate level heat exchanger 20. Thus, in operation hot water returns through the outflowing portion 27, thereby providing warmed output. On the contrary, hot water fed into the inflowing portion 26 of the cold heat exchanger 21 is heat-exchanged with the cold gas passing the cold heat exchanger 21. Thus, in operation cold water returns through the outflowing portion 27, thereby providing cooled output.

Due to the intermediate level heat exchanger 20 and the cold heat exchanger 21, respectively, each having a plurality of fins 28, the area of heat exchange is increased, thereby maximizing the heat exchange effect.

Further, with such advantageous features in the construction of the regeneration heat pump according to the present invention, there is attained an increased effect of minimizing or eliminating unnecessary space. With the simplification of the mechanical components and the ease of the assembly and disassembly of the regenerators, the manufacturing procedures improve which thereby lowers manufacturing cost.

Furthermore, in addition to the benefit in the construction of the heat-exchangers as noted above, the manufacturing procedures of the heat-exchangers are improved, as well as having a high heat-exchange efficiency because of the extensive heat exchange surface.

What is claimed is:

1. A Vuilleumier heat pump comprising:
   a body having first and second axially spaced ends;
   an inner cylinder arrange coaxially within said body in radially spaced relationship therewith to form a space between said body and said inner cylinder;
   first and second axially spaced pistons disposed reciprocally in said inner cylinder, said pistons partitioning the inside of said inner cylinder into a heat chamber located axially adjacent said first end, a cold chamber located axially adjacent said second end, and an intermediate chamber located axially between said heat and cold chambers;
   said space defining a gas passage for communicating said intermediate chamber with each of said heat and cold chambers;
   a hot heat exchanger affixed to said first end of said body for exchanging heat with said heat chamber,
   a heat regenerator positioned in said gas passage axially adjacent said hot heat exchanger and proximate said heat chamber;
   an intermediate level heat exchanger positioned in said gas passage axially adjacent said heat regenerator for exchanging heat with gas passing between said heat chamber and said intermediate chamber and through said heat regenerator;
   a cold regeneration positioned in said gas passage axially adjacent said intermediate level heat exchanger and proximate said intermediate chamber; and
   a cold heat exchanger positioned in said gas passage axially adjacent said cold regenerator for exchanging heat with gas passing between said intermediate chamber and said cold chamber and through said cold regenerator.

2. A Vuilleumier heat pump according to claim 1, wherein said heat regenerator comprises an axial stack of ring-shaped plates surrounding said inner cylinder.

3. A Vuilleumier heat pump according to claim 1, wherein said cold regenerator comprises an axial stack of ring-shaped plates surrounding said inner cylinder.

4. A Vuilleumier heat pump according to claim 1, wherein each of said heat and cold regenerators comprises an axial stack of ring-shaped plates surrounding said inner cylinder.

5. A Vuilleumier heat pump according to claim 4, wherein said plates are enclosed in a metal mesh.

6. A Vuilleumier heat pump according to claim 1, wherein said intermediate level heat exchanger comprises a helical tube surrounding said inner cylinder and carrying external fins.

7. A Vuilleumier heat pump according to claim 1, wherein said cold heat exchanger comprises a helical tube surrounding said inner cylinder and carrying external fins.

8. A Vuilleumier heat pump according to claim 1, wherein each of said intermediate level and cold heat exchangers comprises a helical tube surrounding said inner cylinder and carrying external fins.

9. A Vuilleumier heat pump according to claim 8, wherein each of said heat and cold regenerators comprises an axial stack of ring-shaped plates surrounding said inner cylinder.

10. A Vuilleumier heat pump according to claim 9 including a wall axially separating said heat chamber from said hot heat exchanger said hot heat exchanger comprising a space containing hot gas, said wall carrying heat exchange fins facing said space of said hot heat exchanger.

11. A Vuilleumier heat pump according to claim 1, including a wall axially separating said heat chamber from said hot heat exchanger, said hot heat exchanger comprising a space containing hot gas, said wall carrying heat exchange fins facing said space of said hot heat exchanger.

12. A Vuilleumier heat pump according to claim 1, wherein said body is cylindrical, said inner cylinder being completely encircled by said intermediate level heat exchanger, said heat and cold regenerators, and said cold heat exchanger completely encircles said inner cylinder.

* * * * *